(12) United States Patent
Kämpf

(10) Patent No.: US 10,126,844 B2
(45) Date of Patent: Nov. 13, 2018

(54) DRIFT COMPENSATION/PARALLEL MINIMIZATION

(71) Applicant: STABILO International GmbH, Heroldsberg (DE)

(72) Inventor: Karl-Peter Kämpf, Röttenbach (DE)

(73) Assignee: STABILO INTERNATIONAL GMBH, Heroldsberg (DE)

( * ) Notice: Subject to any disclaimer, the term of this patent is extended or adjusted under 35 U.S.C. 154(b) by 0 days.

(21) Appl. No.: 15/311,368

(22) PCT Filed: May 15, 2015

(86) PCT No.: PCT/EP2015/060776
§ 371 (c)(1),
(2) Date: Nov. 15, 2016

(87) PCT Pub. No.: WO2015/173401
PCT Pub. Date: Nov. 19, 2015

(65) Prior Publication Data
US 2017/0083118 A1 Mar. 23, 2017

(30) Foreign Application Priority Data
May 15, 2014 (DE) .................. 10 2014 106 837

(51) Int. Cl.
*G06F 3/038* (2013.01)
*G06F 3/0354* (2013.01)
(52) U.S. Cl.
CPC ........ *G06F 3/0383* (2013.01); *G06F 3/03545* (2013.01)

(58) Field of Classification Search
None
See application file for complete search history.

(56) References Cited

U.S. PATENT DOCUMENTS

| 5,548,092 A | 8/1996 | Shriver |
| 5,587,558 A | 12/1996 | Matsushima |
| 5,902,968 A | 5/1999 | Sato et al. |

(Continued)

FOREIGN PATENT DOCUMENTS

| KR | 1020040069176 A | 8/2004 |
| KR | 1020110074145 A | 6/2011 |

*Primary Examiner* — Kenneth B Lee, Jr.
(74) *Attorney, Agent, or Firm* — Angela Holt; Bradley Arant Boult Cummings LLP

(57) ABSTRACT

The present invention relates to a method of recognizing and evaluating pen positions of an electronic pen with inertial measurement sensors during writing on a two-dimensional writing substrate, comprising: initially specifying a writing coordinate system with two axes X, Y (101, 102, 201, 202), which are orthogonal to each other, on the writing substrate (108, 205) and an axis Z (103) perpendicular to the two-dimensional writing substrate (108, 205), the X axis (101, 201) defining e.g. the predominant writing direction, and the writing substrate coordinates x, y being defined with respect to said writing coordinate system, and compensating an undesirable drift in the pen position signal of the electronic pen to be output, comprising executing in parallel a coordinate transformation of the azimuthal angle s (105, 203) and of the inclination angle y (104) of the electronic pen (100, 200, 300) into writing substrate coordinates x, y.

10 Claims, 3 Drawing Sheets

(56) References Cited

U.S. PATENT DOCUMENTS

Figure 1B:
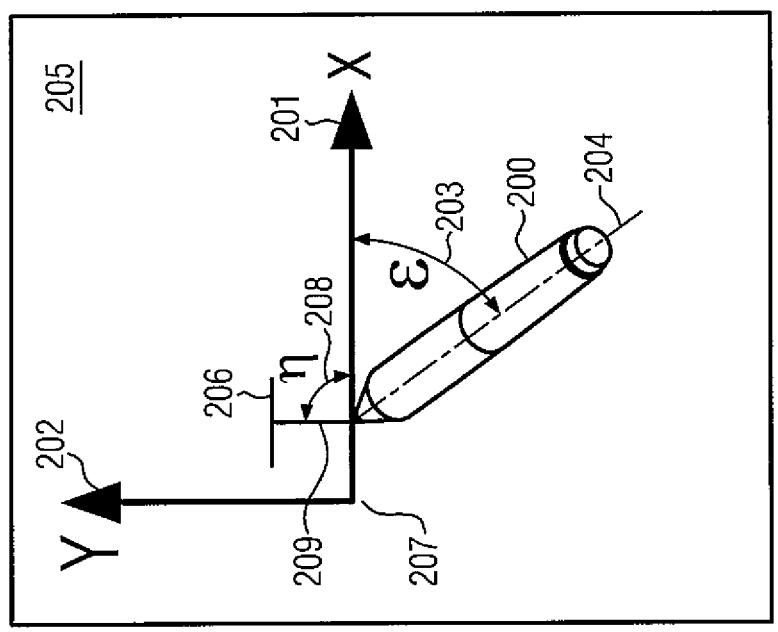

| | | |
|---|---|---|
| 2002/0148655 A1 | 10/2002 | Cho et al. |
| 2004/0140962 A1* | 7/2004 | Wang ................... G06F 3/0346 345/179 |
| 2004/0164972 A1 | 8/2004 | Carl |
| 2005/0168437 A1 | 8/2005 | Carl et al. |
| 2005/0195387 A1* | 9/2005 | Zhang ................. G01B 11/002 356/138 |
| 2006/0279549 A1 | 12/2006 | Zhang et al. |
| 2007/0211239 A1 | 9/2007 | Mandella et al. |

* cited by examiner

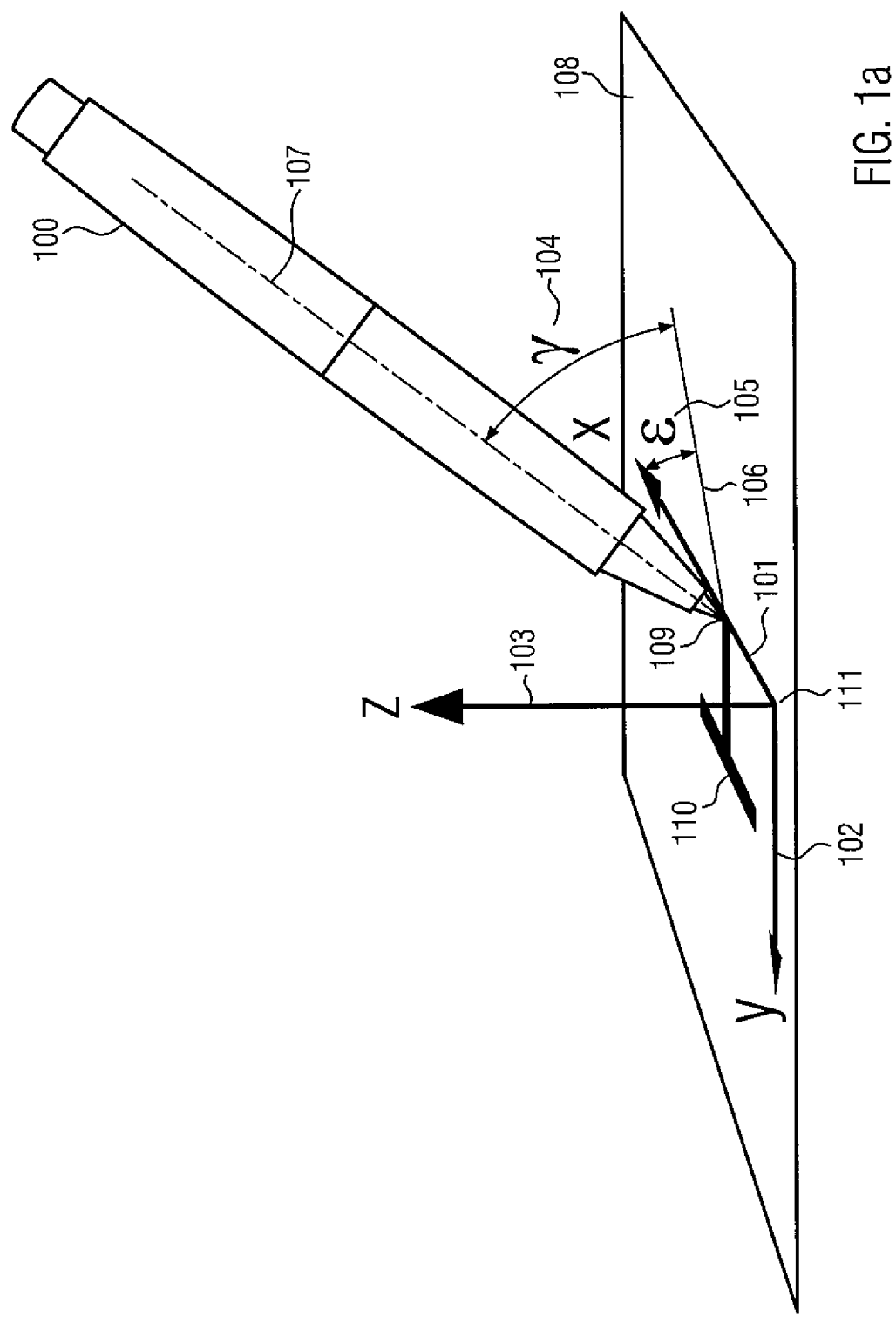

DRIFT COMPENSATION/PARALLEL MINIMIZATION

CROSS-REFERENCE TO RELATED APPLICATIONS

This application is a national stage application of International Application No. PCT/EP2015/060776 titled "Drift Compensation/Parallel Minimization," filed on May 15, 2015 which claims the benefit of German Application No. 10 2014 106 837.8 filed on May 15, 2014, the entire contents of both of these applications are incorporated herein by reference.

PRIOR ART

The present invention relates to a method of recognizing and evaluating motion patterns and pen positions of an electronic pen of the type specified in the preamble of claim 1 as well as to an electronic pen of the type specified in the preamble of claim 9 and a system according to the preamble of claim 10.

When movements of an electronic pen are detected by inertial measurement systems, such as acceleration sensors or rotation rate sensors, the data of said sensors have to be integrated once or twice so as to obtain a velocity signal (first integration) or a location signal (second integration) of the electronic pen. Minor errors in the measurement of accelerations and/or angular velocities by means of the inertial measurement sensors of the electronic pen may result in larger velocity determination errors in the case of the first integration, which, in turn, may result in still larger errors in the location signal after the integration of the velocity signal.

Possible error sources may here comprise not only inherent inaccuracies of numerical integration methods but also, by way of example, inaccuracies of analog-to-digital conversions of measurement sensor signals, zero point errors, e.g. through temperature drift, random interferences or system-inherent noise components.

Since e.g. a new position of the electronic pen is ascertained starting from a previously ascertained position, errors in the determination of the velocity and the location of the electronic pen may accumulate still further and lead to a so-called drift of the movement signal of the electronic pen in an undesirable manner.

Task

It is therefore the object of the present invention to improve an electronic pen, especially with respect to the accuracy with which movements of the electronic pen can be detected, and in particular with respect to an improved drift compensation in the movement signal of the electronic pen.

Solution

According to the present invention, this object is achieved by a method of recognizing and evaluating pen positions of an electronic pen of the type specified in the preamble of claim 1 as well as by an electronic pen of the type specified in the preamble of claim 9 and a system according to the preamble of claim 10.

Advantageous embodiments and further developments are the subject matter of the subclaims.

For detecting the position of the tip or writing rod tip of an electronic pen, said pen can be provided with inertial measurement sensors, and the movement can be reconstructed by integrating the measurement data of these sensors.

A method according to the present invention for recognizing and evaluating movement patterns and pen positions of an electronic pen with inertial measurement sensors during writing on a two-dimensional writing substrate may here comprise the following steps:

initially specifying two axes X, Y, which are orthogonal to each other, on the writing substrate and an axis Z perpendicular to the two-dimensional writing substrate, the X axis defining e.g. a writing direction or the predominant writing direction. The axes X, Y, Z can thus define a reference coordinate system for the electronic pen.

Said initial specification of two axes, which are orthogonal to each other on the writing substrate, e.g. of said X axis and said Y axis, can be carried out as a function of the elevation angle or inclination angle $\gamma$ of the longitudinal axis of the electronic pen with respect to the writing substrate and/or as a function of an azimuthal angle $\varepsilon$ of the longitudinal axis of the electronic pen or of a projection of the longitudinal axis of the electronic pen.

Hence, the axes X, Y can define the writing substrate plane, and positions in the writing substrate plane can be described with the writing substrate coordinates x, y.

Furthermore, said method according to the present invention may comprise a compensation of an undesirable drift in the pen position signal of the electronic pen to be output, comprising the following steps:

executing in parallel a coordinate transformation of the azimuthal angle $\varepsilon$ and of the inclination angle $\gamma$ of the electronic pen into writing substrate coordinates x, y for the values of the azimuthal angle $\varepsilon$ and of the inclination angle $\gamma$ determined from the inertial measurement sensors as well as for a plurality of additional predeterminable values of the azimuthal angle $\varepsilon$ and the inclination angle $\gamma$, which, e.g. in predetermined intervals of values, may lie around the values of the azimuthal angle $\varepsilon$ and of the inclination angle $\gamma$ determined from the inertial measurement sensors, comprising determining the optimum linear combination of the values of the azimuthal angle $\varepsilon$ and of the inclination angle $\gamma$ at which a minimum deviation of an ascertained acceleration of the electronic pen in the Z direction from a predetermined, expected acceleration in the Z direction is achieved, and selecting the determined values of the azimuthal angle $\varepsilon$ and of the inclination angle $\gamma$, which result in a minimum deviation of an ascertained acceleration of the electronic pen in the Z direction from a predetermined, expected acceleration in the Z direction, for correcting a pen position signal to be output, e.g. in particular an acceleration signal of the electronic pen to be output.

In this context it should be pointed out that the term pen position signal may comprise location signals as well as movement and acceleration signals of the electronic pen. Furthermore, the term inertial measurement sensors stands hereinbelow for a plurality of inertial sensors of the electronic pen, which are capable of measuring in three spatial directions, which are orthogonal to one another, accelerations and/or the strength of the local magnetic field and/or rotation rates, in particular the spatial position angle of the electronic pen, e.g. the azimuthal angle $\varepsilon$ and the inclination angle $\gamma$.

A linear combination of values of the azimuthal angle $\varepsilon$ and of the inclination angle $\gamma$ may here stand for a pair of values comprising a respective value of the azimuthal angle $\varepsilon$ and a respective value of the inclination angle $\gamma$.

It follows that, advantageously and preferentially, the values for the azimuthal angle ε and the inclination angle γ can be optimized in common so as to find the optimum pair of values for the azimuthal angle ε and the inclination angle γ in the case of which a minimum deviation of an ascertained acceleration of the electronic pen in the Z direction from a predetermined, expected acceleration in the Z direction, e.g. equal to zero or equal to the acceleration of gravity, is accomplished.

Alternatively, also an independent individual optimization of the values for the azimuthal angle ε and the inclination angle γ is imaginable, which may take place iteratively.

Hence, a deviation of the acceleration from an acceleration to be expected can be detected and a compensation of undesirable drift in the pen position signal to be output, especially a drift correction in the acceleration signal space, i.e. a drift correction of the acceleration signals in the spatial directions X, Y and Z of the writing reference coordinate system of the electronic pen, can be carried out.

For each pair of values of azimuthal angle ε and inclination angle γ among the plurality of pairs of values examined during the optimization, the acceleration in the three spatial directions X, Y and Z of the writing reference coordinate system can be determined, whereupon it is possible to determine or select or interpolate the respective pair of values in the case of which a minimum deviation of an ascertained acceleration of the electronic pen in the Z direction from a predetermined, expected acceleration in the Z direction, e.g. equal to zero or equal to the acceleration of gravity, is accomplished.

If the thus ascertained or corrected acceleration signal in the Z direction is correct, i.e. corresponds to a predetermined, expected value, also the acceleration signals in the other two spatial directions, i.e. the writing substrate axes X and Y, are correct, i.e. they are corrected by the correction of the acceleration signal in the Z direction.

It follows that the optimum linear combination of values for the inclination angle γ and the azimuthal angle ε of the electronic pen can be ascertained, for which the error occurring in the ascertained acceleration in the Z direction or along the Z axis, i.e. the deviation from a Z value of acceleration to be expected, e.g. a Z value of acceleration to be expected which is equal to zero or equal to the acceleration of gravity, becomes minimal.

It is thus possible to correct the acceleration signal in the Z direction, which is ascertained from the inertial measurement sensors, by an acceleration signal determined from the optimum linear combination of the values of the azimuthal angle ε and the inclination angle γ.

In other words, a plurality of solutions of the coordinate transformation can continuously be executed in parallel for various inclination angles γ and azimuthal angles ε and, via a boundary condition for an acceleration in the Z direction to be expected, the optimum or presumably most accurate pair of values for the inclination angle γ and the azimuthal angle ε can be ascertained and this pair of values can be used for calculating a corrected pen position signal and a corrected acceleration signal of the electronic pen.

The determination of the optimum linear combination of values for the inclination angle γ and the azimuthal angle ε may e.g. be based on a simple grid search, in the case of which the values for the inclination angle γ and the azimuthal angle ε are varied with predetermined step widths over predetermined value intervals, and the values for the inclination angle γ and the azimuthal angle ε are determined, in the case of which a minimum deviation of e.g. an acceleration in the Z direction, ascertained from the inertial measurement sensors, from a predetermined, expected acceleration in the Z direction can be accomplished.

The determination of the optimum linear combination of the inclination angle γ and the azimuthal angle ε and the determination of the optimum values for the inclination angle γ and the azimuthal angle ε may e.g. also be executed by means of an Gaussian elimination method or with the aid of other optimization algorithms, e.g. by local gradient methods (e.g. the simplex method), wherein the quantity to be optimized or minimized may here be the deviation of an acceleration in the Z direction, ascertained from the inertial measurement sensors, from a predetermined, expected acceleration in the Z direction.

In this way, a pen position signal to be output can be corrected in an advantageous manner by eliminating possible errors caused by an undesirable drift of the measurement sensors, and especially it can e.g. be checked whether an ascertained inclination angle γ of the electronic pen is correct.

If, for example, the inclination angle γ ascertained in this way is correct, e.g. the value of the acceleration of gravity is obtained as an acceleration value in the axis Z which is orthogonal to the writing substrate plane, in addition to the accelerations of the electronic pen in the coordinates of the writing substrate coordinate axes X, Y, after the coordinate transformation of the accelerations, measured e.g. by the inertial measurement sensors, into the writing substrate coordinates x, y, described by the orthogonal writing substrate coordinate axes X, Y.

If the thus ascertained value of the Z acceleration should deviate from the value of the acceleration of gravity, although the tip of the pen is in contact with the sheet or writing substrate, as can easily be detected e.g. via a writing pressure sensor, there will be an error in the ascertained inclination angle γ in all likelihood.

Such an error may be caused e.g. by an undesirable sensor drift in the measurement sensors of the electronic pen, but it may e.g. also be caused by anomalies of the magnetic field surrounding the pen and the writing substrate, respectively.

If, however, the acceleration of gravity has been subtracted from the measured acceleration sensor data prior to the integration of the acceleration sensor data, the value of the acceleration in the Z direction to be expected and the Z signal in the writing substrate coordinate system to be expected, or if e.g. a writing pressure sensor signalizes that there is contact with the writing substrate, will ideally be equal to zero.

Deviations from a Z value to be expected, e.g. the value of the acceleration in Z, may therefore be indications of errors in the position calculation of the pen, which have been caused e.g. by drift errors of the measurement sensors.

However, said possible drift errors can be corrected and compensated for, at least partially, by the above-mentioned coordinate transformation of the inclination angle γ and the azimuthal angle ε of the electronic pen into the writing substrate plane with writing substrate coordinates x, y, said coordinate transformation being executed in parallel for a plurality of values for the azimuthal angle ε and the inclination angle γ and followed by a determination of the linear combination of values for the azimuthal angle ε and the inclination angle γ, in the case of which an error in the ascertained acceleration in the Z direction becomes minimal.

The phrase "a plurality of or a multitude of values for the azimuthal angle ε and the inclination angle γ for determining the optimum linear combination of the azimuthal angle ε and the inclination angle γ" may e.g. describe that, starting from initial values for the azimuthal angle ε and the inclination angle γ, the azimuthal angles ε and the inclination angles γ can be varied e.g. in intervals of +/−10° or +/−20° or +/−30° around the respective initial value.

An exemplary initial value for the azimuthal angle ε may e.g. be a value of +30°±10°, and an exemplary initial value for the inclination angle γ may be +45°±10°.

Exemplary preferred step widths for varying the values for the azimuthal angle ε and the inclination angle γ for determining the optimum linear combination of the values of the azimuthal angle ε and of the inclination angle γ may here be smaller than or equal to 3°, or smaller than or equal to 1°, or smaller than or equal to 0.1°.

Exemplarily, also a minimum configuration for determining the optimum linear combination of the azimuthal angle ε and the inclination angle γ is imaginable, in the case of which the value examined is at least one respective value of 1° or 3° above and below an expected value or initial value for the azimuthal angle ε and the inclination angle γ, i.e. the optimum pair of values of the values for the azimuthal angle ε and the inclination angle γ can be determined or interpolated from at least 9 pairs of values.

This may advantageously suffice for being able to correct or compensate e.g. errors of the order of approx. 3° of the values for the position angles, viz. the azimuthal angle ε and the inclination angle γ, determined from the inertial measurement sensors, as well as pen position errors, which may occur e.g. in a time interval of 10-25 ms due to undesirable drift.

A correction of the velocity component of the writing tip in Z, ascertained from the inertial measurement sensors, may additionally also be executed e.g. by zeroing the Z value or velocity value in Z, when the pen contacts the writing substrate.

It is also possible to advantageously ascertain the orientation of the measurement sensors relative to the direction of the force of gravity, ascertained e.g. by means of magnetic-field or rotation rate sensors as well as sensor fusion methods.

The inertial measurement sensors and possible other sensors (such as writing force pressure sensors, magnetic field sensors, rotation rate sensors, etc.) can pick up measurement data at least every 50 ms, when the electronic pen is in use, so as to guarantee that the sampling frequency is higher than the writing frequency or eigenfrequency (e.g. 3 Hz to 7 Hz) of the writer's hand so that all the movements of the hand and of the electronic pen, respectively, can be detected in a sufficiently accurate manner.

In other words, the sampling frequency may be equal to or higher than the minimum sampling frequency determined by the Nyquist-Shannon theorem.

Depending on the mode of operation of the electronic pen, the coordinate systems used for evaluating the pen positions can be initialized in different ways. Whereas in the case of a drawing, it may make sense to know the absolute position of the electronic pen on the writing substrate (or the position relative to reference points on the writing substrate, e.g. paper), the dynamic sequence of movements of the electronic pen itself can already suffice to recognize e.g. the handwriting.

An initial specification of two axes, which are orthogonal to each other on the writing substrate, e.g. said X axis and said Y axis, can be carried out as a function of the elevation angle or inclination angle γ of the longitudinal axis of the electronic pen with respect to the writing substrate and/or as a function of an azimuthal angle ε of the longitudinal axis of the electronic pen or of a projection of the longitudinal axis of the electronic pen.

For example, in the case of a typical writing posture, the azimuthal angle ε can be defined as the angle between the X axis of the coordinate system to be specified and the line of intersection along which a plane, defined by the longitudinal axis of the pen and a writing substrate perpendicular, intersects the writing substrate plane.

On the basis of a specified first coordinate axis on the writing substrate, a second coordinate axis can then be specified on the writing substrate via the demanded orthogonality, the coordinate system being here selectively specifiable as a left- or right-handed coordinate system.

At the beginning of the recording of the pen position data, the azimuthal angle ε can be assumed to have a fixed value, which is determinable e.g. from empirical data.

As mentioned above, e.g. a value of +30°±10° may be specified as a preferred initial value of the azimuthal angle ε.

When the X direction is defined e.g. as a predominant writing direction and the Y direction as a direction perpendicular thereto in the plane of the sheet, an averaged constant movement in the X direction and small, temporary deflections in the X and Y directions can be assumed.

It can here be assumed that the velocities of the writing rod tip are e.g. approx. 1.0±0.5 m/s and that they oscillate at the typical writing movement frequency between 3 and 7 Hz. The averaged or expected writing velocity in the X direction may thus lie at 1.0±0.5 m/s and the averaged writing velocity in the Y direction may lie at 0 m/s.

If it is ascertained that said writing rod tip velocity is exceeded, this may also be attributed to a drift in the measurement sensors.

A correction or compensation of a drift can be accomplished e.g. by a plausibility check of the writing rod tip position. When the writing rod tip is e.g. located at a position below the X axis (i.e. below the writing direction), it can be assumed that the next movement will be an upward movement and the position signal can be corrected e.g. with a ramp, which enforces this result.

The signal of the X position can be dealt with analogously: if there is an excessive signal advance or signal delay relative to the expected value in the long run, also this signal can be corrected with a ramp.

Since, due to the process of writing, the look of the person who writes is normally directed onto the writing substrate and e.g. not to a display device, a few seconds will normally be available for correcting that which has been written.

Hence, it is e.g. possible to distort or correct the last written letters by means of (e.g. quadratically increasing) ramps (equivalent to zero shifts of the integration results of the writing position signal), without this being discerned by the person who writes.

As the writing process continues, said azimuthal angle ε can be examined, defined more precisely and adapted still further by defining e.g. the major axis of the writing movements, which are carried out e.g. at a writing movement frequency of 3 to 7 Hz, with respect to a biometric inclination angle β relative to the writing direction axis (e.g. X axis).

Said biometric inclination angle β can be specified e.g. through the axis of rotation of the proximal interphalangeal joint of the index finger of the writing hand.

The axis of rotation of the proximal interphalangeal joint of the index finger is given through the biomechanics of the writing hand and its orientation relative to the X axis is a typical parameter by means of which the individual handwriting can be characterized.

The biometric inclination angle β can be set, for example by the user, e.g. in default settings of the signal-processing software of the electronic pen so that a desired inclination of the handwriting relative to the writing direction can be adjusted.

The velocity of the averaged constant movement in the writing direction can be used as a measure for the elongation or compression of the reproduced handwriting with respect to a reference velocity of the averaged constant writing movement.

For improving the velocity of the averaged constant movement in the writing direction, said velocity being ascertained from the sensor data of the electronic pen, the user can set a writing-velocity initial value which is typical of his handwriting, e.g. 0.1 to 2 cm/s, preferably 1±0.5 cm/s.

A compensation of an undesirable drift in the pen position signal of the electronic pen to be output may additionally comprise, over a predetermined time interval and a predetermined frequency, a moving averaging of the pen movements, which occur along the two orthogonal axes X, Y and which are determined by the inertial measurement sensors during writing through integration of the sensor data of said measurement sensors, and in addition a periodic comparison of moving averages ascertained at the moment in question with initial averages and/or with previously ascertained moving averages, and a subtraction of deviations occurring during said comparison between moving averages ascertained at the moment in question and initial averages and/or deviations occurring between moving averages ascertained at the moment in question and previously ascertained moving averages, from a pen position signal to be output.

The averages of the pen position signal which are ascertained at the moment in question along said two orthogonal axes X, Y can thus be compared continuously with previously ascertained averages of the pen position signal and/or with previously specifiable, expected output averages.

In other words, deviations of the writing movement ascertained at the moment in question, in particular deviations of the ascertained writing movement direction, from a movement, postulated on the basis of previously ascertained or specified averages of the pen position signal, or from a postulated writing movement direction, can be interpreted as drift and subtracted from the ascertained pen position signal, i.e. from the ascertained location value, prior to outputting the pen position signal, i.e. the location signal, e.g. on a graphic display unit.

The time interval over which the moving averages of the pen movements ascertained from the sensor data by integration are formed may here be longer than 1 s, 2 s or 5 s.

Prior to integrating the sensor data so as to ascertain the location signal of the electronic pen and prior to extracting its movement in the writing direction, i.e. the X direction, the frequencies above and below the typical writing movement frequency of the user (3 to 7 Hz) can be removed from the sensor data by means of a highpass filter and a lowpass filter.

In other words, the sensor data can already be filtered and smoothed prior to an integration of the sensor data and drift signals of the measurement sensors can already be corrected and compensated for, at least partially.

This smoothing and filtering can reduce the noise in the sensor data and allow thus a better integration of the sensor data, and they can reduce a drift signal that may perhaps remain after the integration.

The filtering of the sensor data may comprise well-established methods of moving averaging. In addition to the use of classic filtering techniques, such as the Fast Fourier Transformation, e.g. an advantageous numeric transformation may be executed in particular through wavelet filters. A good success can here already be achieved by a simple basic-pattern or basic wavelet, such as the Haar wavelet.

For the sake of completeness, it should be pointed out that, when the writing movement is executed on a two-dimensional writing substrate surface, e.g. a sheet of paper, the drift in a direction perpendicular to the plane of the sheet can be detected immediately and easily be compensated for.

Information from a detected drift perpendicular to the plane of the sheet may, in addition, also be used for correcting errors occurring in the spatial position detection of the electronic pen.

Additional values supporting the determination and compensation of an undesirable drift in the pen position signal to be output with respect to the writing direction can be obtained by adding e.g. a writing pressure signal, provided e.g. by a writing force pressure sensor coupled to the writing rod.

A short (e.g. shorter than 0.3 s), high pressure pulse is normally the result of a full stop/dot (at the end of a sentence or a dot over an i), in the case of which the tip of the pen comes to rest for the respective moment in time, i.e. the tip of the pen does not move in the writing substrate plane.

At this point of rest of the writing rod tip of the electronic pen with respect to the writing substrate plane, which results e.g. from the above-mentioned setting of a full stop/dot, the drift in the X and Y directions can locally be read from the integrated velocity signal, and the pen position signal to be output can be corrected in this way.

Furthermore, the inclination of the handwriting of the ascertained pen position signal can be corrected, i.e. errors in the ascertained inclination of the handwriting or an undesirable drift of the handwriting inclination signal can also be corrected and compensated for by comparing the ascertained inclination of the handwriting with a postulated inclination of the handwriting. Possible deviations resulting from said comparison can then be corrected, before the pen position signal, i.e. the location signal, is output, through a suitable transformation of the ascertained pen position signal, i.e. the ascertained location value.

The postulated or desired handwriting inclination may here be preset e.g. by the user, e.g. as an input for a digital control unit of the electronic pen or as a parameter for a data evaluation unit. The postulated or desired handwriting inclination may here be considered as the characteristic inclination of a user's handwriting.

Said postulated or desired handwriting inclination may here result from an analysis with respect to a preferential direction of the frequency distribution of the direction of electronic-pen writing movements at the writing frequency or eigenfrequency (3 Hz to 7 Hz) of the writing hand and can be characterized e.g. by a direction angle η of a preferential direction of writing, such as the angle between a character axis and the writing direction axis, e.g. the X axis.

The angle between this ascertained preferential direction and the desired inclination of the handwriting can then be used as a basis for compensating the inclination of the handwriting. To this end, e.g. a rectangle can first be specified, which comprises the handwriting of a written line along the writing direction and which can then be sheared with the desired handwriting inclination compensation angle.

In addition, the inclination of the electronic pen in space, i.e. the inclination angle γ which has already been introduced above, can be measured through magnetic field sensors and rotation rate sensors.

If, for example, the thus obtained inclination angle γ is correct, e.g. the value of the acceleration of gravity is obtained as a predetermined, expected value of the acceleration in the Z direction, in addition to the accelerations of the electronic pen in the coordinates of the writing substrate coordinate axes X, Y, after the coordinate transformation of the accelerations, measured e.g. by the inertial measurement sensors, into the writing substrate coordinates x, y, described by the orthogonal writing substrate coordinate axes X, Y.

If, for example, the thus ascertained value of the Z acceleration should deviate from the value of the acceleration of gravity, although e.g. the tip of the pen is in contact with the sheet or writing substrate, as can easily be detected e.g. via a writing pressure sensor, there will be an error in the ascertained inclination angle γ in all likelihood. Such an error may be caused e.g. by an undesirable sensor drift in the measurement sensors of the electronic pen, but it may e.g. also be caused by anomalies of the magnetic field surrounding the pen and the writing substrate, respectively.

If, for example, the acceleration of gravity has been subtracted from the measured acceleration sensor data prior to the integration of said acceleration sensor data, the acceleration in Z, i.e. the Z signal in the writing substrate coordinate system, or if e.g. a writing pressure sensor signalizes that there is contact with the writing substrate, will ideally be equal to zero.

If this is not the case, this may be due to the fact that the writing substrate is not positioned horizontally, and a small value correlated with the X and Y signals may remain, from which the inclination of the writing substrate (or the error in the calculation of the acceleration of gravity) can be ascertained.

Deviations from a Z value to be expected, e.g. the value of the acceleration in Z, may therefore be indications of errors in the position calculation of the pen, which may e.g. be indicative of an incorrect inclination angle γ, and may be corrected by means of the above described method for determining the optimum linear combination of the position angles, viz. the azimuthal angle ε and the inclination angle γ, and e.g. also by zeroing the Z value or acceleration value in Z, when the pen contacts the writing substrate.

As mentioned above, an inclination information or an inclination angle γ corrected in accordance with the present invention can also reduce errors in the X and Y axes of the acceleration signal in an advantageous manner.

On the basis of this correction, it is also imaginable to provide a mapping of the magnetic anomalies along the writing substrate coordinates and to allow absolute referencing on the basis of these anomalies.

This absolute referencing can be realized e.g. by intentionally distorting the local magnetic field (e.g. through a permanent magnet located in the vicinity thereof). To this end, a permanent magnet may be accommodated e.g. in the cap of the pen and be deposited, during writing, in the vicinity of the writing substrate at a well-defined location, e.g. on the margin of the writing substrate, e.g. on the margin of a writing substrate in A4 format. The minimum distance between the permanent magnet and the electronic pen which may here preferably be observed is a distance of e.g. more than 1, 2 or 3 cm, so as to prevent excessive loads on the magnetic field sensor.

The strength of the magnetic field or the change in said strength will then allow conclusions to be drawn on the distance to the magnet, and the direction of the magnetic field allows conclusions to be drawn on the position of the electronic pen, which can then advantageously be expressed in polar coordinates.

In other words, the determination of the inclination angle γ in combination with the measurement of the strength or of the change of the natural magnetic field or of an artificial magnetic field allows absolute referencing of the position signal, i.e. of the location, of the electronic pen on the writing substrate.

Hence, an electronic pen with pen position recognition according to the present invention may comprise a writing rod, at least one electric voltage source, at least one digital control unit, at least one data transmission module as well as inertial measurement sensors and it may be characterized in that the digital control unit may be configured for initially specifying a writing coordinate system with two orthogonal axes X, Y on the writing substrate and an axis Z perpendicular to the two-dimensional writing substrate, wherein the X axis defines the predominant writing direction and the writing substrate coordinates x, y are defined with respect to said writing coordinate system, and may additionally be configured for compensating an undesirable drift in the pen position signal of the electronic pen to be output.

The digital control unit may here additionally be configured for executing in parallel a coordinate transformation of the azimuthal angle ε and of the inclination angle γ of the electronic pen into writing substrate coordinates x, y for the values of the azimuthal angle ε and of the inclination angle γ determined from the inertial measurement sensors as well as for a plurality of additional predeterminable values of the azimuthal angle ε and the inclination angle γ, comprising determining the optimum linear combination of the values of the azimuthal angle ε and of the inclination angle γ at which a minimum deviation of an ascertained acceleration of the electronic pen in the Z direction from a predetermined, expected acceleration in the Z direction is accomplished, and may additionally be configured for selecting the determined values of the azimuthal angle ε and of the inclination angle γ, which result in a minimum deviation of an ascertained acceleration of the electronic pen in the Z direction from a predetermined, expected acceleration in the Z direction, for correcting a pen position signal to be output.

A device for electronically recognizing pen positions according to the present invention may, among other functions, have the function of checking or repeating the calculations and corrections carried out by the electronic pen for determining pen positions and drift corrections, and, if necessary, of supplementing and/or correcting them, as well as of additionally and primarily allowing to output the processed data of an electronic pen on a data output unit and/or to store them on a data storage unit.

Hence, a device for electronically recognizing pen positions according to the present invention may comprise an electronic pen of the above described type, which may be configured for executing a method of the above described type, and at least one data reception module for receiving data transmitted by the data transmission module of the electronic pen, a data evaluation unit for evaluating and processing the received data, a data output unit and a data storage unit, and it may be characterized in that the data evaluation unit is capable of integrating the received data and of correcting errors therein, including the above described method for drift compensation, and of outputting the processed data on the data output unit and/or of storing them on the data storage unit.

The following figures show exemplarily:

FIG. 1a: a schematic three-dimensional view of an exemplary writing-substrate coordinate system of an electronic pen.

FIG. 1b: a schematic top view of an exemplary writing-substrate coordinate system of an electronic pen.

Figure 2:
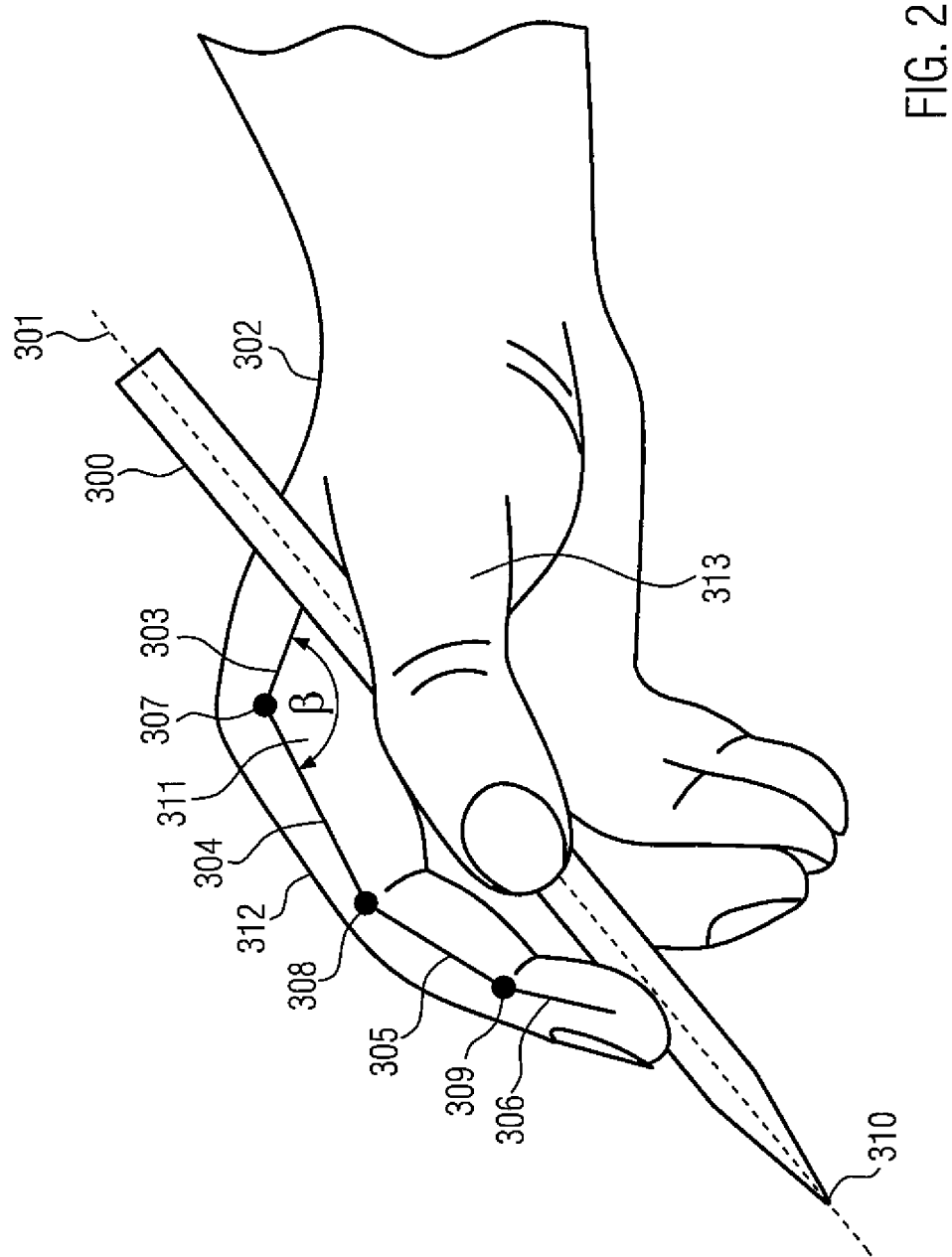

FIG. 2: a schematic example of specifying a biometric inclination angle β.

FIG. 1a exemplarily shows a three-dimensional view of an exemplary writing-substrate coordinate system 111 of an electronic pen 100, which is capable of writing characters 110 on a two-dimensional writing substrate 108.

The axes X (101), Y (102), which extend in the writing substrate plane and which can be specified as described above, are orthogonal to each other and the axis Z (103) is perpendicular to the writing substrate 108.

The elevation angle or inclination angle γ (104) of the electronic pen 100 may e.g. be defined as the angle between the longitudinal axis 107 of the electronic pen 100 and the writing substrate 108, i.e. the two-dimensional writing substrate plane.

The azimuthal angle ε (105) of the electronic pen 100 can be defined as an angle between the longitudinal axis 107 of the electronic pen 100 and the X axis 101 or as an angle between a projection 106 of the longitudinal axis 107 of the electronic pen 100 onto the writing substrate 108 and the X axis 101.

As has already been mentioned, the axes X (101), Y (102), which are orthogonal to each other on the writing substrate 108, may initially be specified as a function of the elevation angle or inclination angle γ (104) of the longitudinal axis 107 of the electronic pen 100 with respect to the writing substrate 108.

For example, in the case of a typical writing posture, the azimuthal angle ε (105) can be defined as the angle between the X axis 101 of the coordinate system 111 to be used/to be specified and the projection 106 of the longitudinal axis 107 of the pen onto the writing substrate 108, i.e. the line of intersection along which a plane, defined by the longitudinal axis 107 of the pen and a writing substrate perpendicular, intersects the writing substrate plane.

On the basis of a first coordinate axis, e.g. the X axis 101, on the writing substrate 108, which is specified e.g. according to the specification of the azimuthal angle ε (105), it is then possible to specify a second coordinate axis, e.g. the Y axis 102, on the writing substrate 108 via the demanded orthogonality, the coordinate system being here selectively specifiable as a left- or right-handed coordinate system. Also a third axis, the Z axis 103, which is perpendicular to the writing substrate 108, can be derived from the specified axes X (101), Y (102) through a demanded orthogonality with respect to said axes X (101), Y (102).

The coordinate system X, Y, Z (111) shown in FIG. 1a is e.g. a right-handed coordinate system.

It is also imaginable to use for inclination angles γ (104) of the pen longitudinal axis 107 which are different from 90° the projection 106 of the pen longitudinal axis 107 onto the writing substrate 108 for defining a first coordinate axis, e.g. the Y axis 102.

The writing direction of the electronic pen 100 may be defined, e.g. by the X axis 101.

In addition, FIG. 1a shows exemplarily a character 110, e.g. a "T", written with the writing rod tip 109 of the electronic pen 100 on the writing substrate 108.

FIG. 1b shows exemplarily the schematic top view of a writing-substrate coordinate system 207 of an electronic pen 200, which is analogous to or identical with the writing-substrate coordinate system of FIG. 1a.

The azimuthal angle ε (203) of the electronic pen 200 is here defined e.g. as angle between the longitudinal axis 204 of the electronic pen 200 and the X axis 201. In other words, it is e.g. a selection of the azimuthal angle ε (203) that specifies the X axis 201 and, as described above, a first coordinate axis specified on the writing substrate 205 can then be used for specifying on the basis thereof, through an orthogonality demand, the second coordinate axis on the writing substrate 205, e.g. the Y axis 202, as well as the third coordinate axis, e.g. the Z axis (not shown), which is perpendicular to the writing substrate 205.

In addition, just as FIG. 1a, also FIG. 1b exemplarily shows a character 110 written with the electronic pen 100 on the writing substrate 108, viz. an exemplary "T", which may comprise a first character axis or major axis 209, e.g. a longitudinal line, and a second character axis or minor axis 206, e.g. a horizontal line.

Here, e.g. a direction angle η (208) of a preferential direction of writing may be defined as an angle between a character axis 209 and the axis of the direction of writing, e.g. the X axis 201.

FIG. 2 exemplarily shows a three-dimensional view of the writing hand 302 of a user of an electronic pen 300.

The electronic pen 300 with the writing rod tip 310 is here exemplarily located between the index finger 312 and the thumb 313 of the user.

In addition, the figure shows exemplarily the first 303, second 304, third 305 and fourth 306 articular bones of the index finger 312, including its first (metacarpophalangeal joint) 307, second (proximal interphalangeal joint) 308 and third (distal interphalangeal joint) 309 joint.

The value of an azimuthal angle ε of the above-defined type can be specified e.g. through a biometric inclination angle β (311) defined between a first articular bone 303 of the writing hand index finger 302 and a second articular bone 304 of the writing hand index finger 302, and additionally characterized by the spatial orientation of the axis of rotation (not shown) of the proximal interphalangeal joint 308 of the index finger 312 of the writing hand 302 of the user during writing.

The axis of rotation of the proximal interphalangeal joint of the index finger is given through the biomechanics of the writing hand, and its orientation relative to the X axis (not shown) is a typical parameter by means of which the individual handwriting can be characterized.

The biometric inclination angle β (311) can be set, for example by the user, e.g. in default settings of the signal-processing software of the electronic pen 300.

For the sake of completeness, it should be mentioned that the features, definitions and/or magnitudes which are exemplarily described in the figures can be combined in accordance with the present invention.

Followed by 3 sheets with 3 figures. The reference numerals identify the following components:

100 electronic pen
101 first coordinate axis, e.g. X axis
102 second coordinate axis, e.g. Y axis
103 third coordinate axis, e.g. Z axis
104 elevation angle or inclination angle γ of the longitudinal axis of the electronic pen with respect to the writing substrate
105 azimuthal angle ε
106 projection of the longitudinal axis 107 of the electronic pen 100 onto the writing substrate 108 or line of intersection along which a plane, defined by the longitudinal axis 107 of the pen and a writing substrate perpendicular, intersects the writing substrate plane.

107 longitudinal axis of the electronic pen
108 writing substrate/writing substrate plane
109 writing rod tip
110 character written with the electronic pen
111 coordinate system X, Y, Z, reference coordinate system
200 electronic pen
201 first coordinate axis, e.g. X axis
202 second coordinate axis, e.g. Y axis
203 azimuthal angle ε
204 longitudinal axis of the electronic pen
205 writing substrate/writing substrate plane
206 second character axis or minor axis
207 coordinate system X, Y, Z, reference coordinate system
208 direction angle η of a preferential direction of writing
209 first character axis or major axis
300 electronic pen
301 longitudinal axis of the electronic pen
302 writing hand of a user of an electronic pen 300
303 first articular bone of the index finger of the writing hand
304 second articular bone of the index finger of the writing hand
305 third articular bone of the index finger of the writing hand
306 fourth articular bone of the index finger of the writing hand
307 first joint (metacarpophalangeal joint) of the index finger of the writing hand
308 second joint (proximal interphalangeal joint) of the index finger of the writing hand
309 third joint (distal interphalangeal joint) of the index finger of the writing hand
310 writing rod tip
311 biometric inclination angle β
312 index finger of the writing hand of a user
313 thumb of the writing hand of a user

The invention claimed is:

1. A method of recognizing and evaluating pen positions of an electronic pen (100, 200, 300) with inertial measurement sensors during writing on a two-dimensional writing substrate (108, 205), the method comprising
    initially specifying a writing coordinate system with two axes X, Y (101, 102, 201, 202), which are orthogonal to each other on the writing substrate (108, 205) and an axis Z (103) perpendicular to the two-dimensional writing substrate (108, 205), the X axis (101, 201) defining a predominant writing direction, and writing substrate coordinates x, y being defined with respect to said writing coordinate system,
    compensating an undesirable drift in a pen position signal of the electronic pen to be output, the compensating comprising:
    executing in parallel a coordinate transformation of the azimuthal angle ε (105, 203) and of the inclination angle γ (104) of the electronic pen (100, 200, 300) into writing substrate coordinates x, y for the values of the azimuthal angle ε (105, 203) and of the inclination angle γ (104) determined from the inertial measurement sensors as well as for a plurality of additional predeterminable values of the azimuthal angle ε (105, 203) and the inclination angle γ (104), the coordinate transformation comprising
    determining the optimum linear combination of the values of the azimuthal angle ε (105, 203) and of the inclination angle γ (104) at which a minimum deviation of an ascertained acceleration of the electronic pen in the Z direction from a predetermined, expected acceleration in the Z direction is accomplished, and
    selecting the determined values of the azimuthal angle ε (105, 203) and of the inclination angle γ (104), which result in a minimum deviation of an ascertained acceleration of the electronic pen in the Z direction from a predetermined, expected acceleration in the Z direction, for correcting a pen position signal to be output.

2. The method according to claim 1, wherein the azimuthal angle ε (105, 203) is defined as the angle between the X axis of the coordinate system (111, 207) to be specified and the line of intersection (106) along which a plane, defined by the longitudinal axis of the pen and a writing substrate perpendicular, intersects the writing substrate plane.

3. The method according to claim 1, wherein a value of +30°±10° is specified as an initial value of the azimuthal angle ε (105, 203).

4. The method according to claim 1, wherein values of the azimuthal angles ε (105, 203) and/or of the inclination angles γ (104) are varied in step widths of ≤1° or ≤0.1° for determining the optimum linear combination of the values of the azimuthal angles ε (105, 203) and of the inclination angles γ (104).

5. The method according to claim 1, wherein the predetermined, expected acceleration in the Z direction is equal to zero or equal to the acceleration of gravity.

6. The method according to claim 1, wherein at a point of rest of the writing rod tip of the electronic pen with respect to the writing substrate plane, said point of rest resulting from the setting of a full stop/dot, the drift in the X and Y directions is locally read from the integrated velocity signal, and the pen position signal to be output is corrected in this way.

7. The method according to claim 1, wherein errors in the ascertained inclination of the handwriting are corrected and compensated for by comparing the ascertained inclination of the handwriting with a postulated inclination of the handwriting.

8. The method according to claim 1, wherein an absolute referencing of the position, of the location signal, of the electronic pen (100, 200, 300) on the writing substrate (108, 205) is carried out through a determination of the inclination angle γ (104) together with the measurement of the strength of or of the change of the natural magnetic field or of a local artificial magnetic field.

9. An electronic pen (100, 200, 300) with pen position recognition, the pen comprising a writing rod, at least one electric voltage source, at least one digital control unit, at least one data transmission module as well as inertial measurement sensors,
    characterized in that
    the digital control unit is configured for specifying a writing coordinate system with two orthogonal axes X, Y (101, 102, 201, 202) on the writing substrate (108, 205) and an axis Z (103) perpendicular to the two-dimensional writing substrate (108, 205), wherein the X axis (101, 201) defines a predominant writing direction and the writing substrate coordinates x, y are defined with respect to said writing coordinate system, and is additionally configured for compensating an undesirable drift in a pen position signal of the electronic pen (100, 200, 300) to be output, comprising a configuration of the digital control unit for:

executing in parallel a coordinate transformation of the azimuthal angle ε (105, 203) and of the inclination angle γ (104) of the electronic pen (100, 200, 300) into writing substrate coordinates x, y for the values of the azimuthal angle ε (105, 203) and of the inclination angle γ (104) determined from the inertial measurement sensors as well as for a plurality of additional predeterminable values of the azimuthal angle ε (105, 203) and the inclination angle γ (104), the coordinate transformation comprising determining the optimum linear combination of the values of the azimuthal angle ε (105, 203) and of the inclination angle γ (104) at which a minimum deviation of an ascertained acceleration of the electronic pen in the Z direction from a predetermined, expected acceleration in the Z direction is accomplished, and selecting the determined values of the azimuthal angle ε (105, 203) and of the inclination angle γ (104), which result in a minimum deviation of an ascertained acceleration of the electronic pen in the Z direction from a predetermined, expected acceleration in the Z direction, for correcting a pen position signal to be output.

10. A system for electronically recognizing pen positions, comprising an electronic pen (100, 200, 300) according to claim 9 and configured for executing a method of recognizing and evaluating pen positions of an electronic pen (100, 200, 300) with inertial measurement sensors during writing on a two-dimensional writing substrate (108, 205), the method comprising initially specifying a writing coordinate system with two axes X, Y (101, 102, 201, 202), which are orthogonal to each other on the writing substrate (108, 205) and an axis Z (103) perpendicular to the two-dimensional writing substrate (108, 205), the X axis (101, 201) defining a predominant writing direction, and writing substrate coordinates x, y being defined with respect to said writing coordinate system, compensating an undesirable drift in a pen position signal of the electronic pen to be output, the compensating comprising:

executing in parallel a coordinate transformation of the azimuthal angle ε (105, 203) and of the inclination angle γ (104) of the electronic pen (100, 200, 300) into writing substrate coordinates x, y for the values of the azimuthal angle ε (105, 203) and of the inclination angle γ (104) determined from the inertial measurement sensors as well as for a plurality of additional predeterminable values of the azimuthal angle ε (105, 203) and the inclination angle γ (104), the coordinate transformation comprising determining the optimum linear combination of the values of the azimuthal angle ε (105, 203) and of the inclination angle γ (104) at which a minimum deviation of an ascertained acceleration of the electronic pen in the Z direction from a predetermined, expected acceleration in the Z direction is accomplished, and selecting the determined values of the azimuthal angle ε (105, 203) and of the inclination angle γ (104), which result in a minimum deviation of an ascertained acceleration of the electronic pen in the Z direction from a predetermined, expected acceleration in the Z direction, for correcting a pen position signal to be output;

at least one data reception module for receiving data transmitted by the data transmission module of the electronic pen (100, 200, 300), a data evaluation unit for evaluating and processing the received data, a data output unit and a data storage unit, the data evaluation unit capable of integrating the received data and of correcting errors therein and of outputting the processed data on the data output unit or of storing them on the data storage unit.

* * * * *